(12) United States Patent
Li

(10) Patent No.: US 8,266,395 B2
(45) Date of Patent: Sep. 11, 2012

(54) DETECTING ATTEMPTS TO CHANGE MEMORY

(75) Inventor: Christopher Li, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 685 days.

(21) Appl. No.: 12/050,886

(22) Filed: Mar. 18, 2008

(65) Prior Publication Data

US 2008/0235757 A1    Sep. 25, 2008

Related U.S. Application Data

(60) Provisional application No. 60/896,599, filed on Mar. 23, 2007.

(51) Int. Cl.
*G06F 12/00* (2006.01)

(52) U.S. Cl. ........ 711/156; 711/113; 711/154; 711/155; 711/163

(58) Field of Classification Search .................. 711/113, 711/155, 156, 154, 163
See application file for complete search history.

(56) References Cited

U.S. PATENT DOCUMENTS

| | | | |
|---|---|---|---|
| 6,397,242 B1* | 5/2002 | Devine et al. | 718/1 |
| 7,340,574 B2* | 3/2008 | Hall et al. | 711/163 |
| 2004/0181601 A1* | 9/2004 | Sakthikumar | 709/229 |
| 2006/0095896 A1* | 5/2006 | Li et al. | 717/136 |
| 2007/0055837 A1* | 3/2007 | Rajagopal et al. | 711/163 |

* cited by examiner

*Primary Examiner* — Jared Rutz
*Assistant Examiner* — Gurtej Bansal

(57) ABSTRACT

A system and method for detecting changes of memory state. In accordance with one embodiment, memory locations to be observed are determined, and pages of these locations are marked as read-only. Then, guest instructions execute during a trial period. During the trial period, guest instructions attempting to write to the identified memory locations cause page faults which result in identifying the instructions. At the end of the trial period, the pages are returned to a writable status, and attempts to modify the memory locations by the guest code are detected based on the instruction identifier. The system and method can be used for efficient frame list topology monitoring, such as in a virtual USB controller of a virtual machine.

18 Claims, 7 Drawing Sheets

DETECTING ATTEMPTS TO CHANGE MEMORY

This application claims the benefit of U.S. Provisional Application No. 60/896,599, filed Mar. 23, 2007, which provisional application is incorporated herein by reference in its entirety.

FIELD OF THE INVENTION

One or more embodiments of the present invention relate to computers and computer systems, including virtualized computers and systems, and more particularly, to detecting attempts to change memory, for example and without limitation, in a virtual machine of a virtualized computer system.

BACKGROUND

Detecting changes to memory is useful in many areas. One example is in virtualized computer systems, and a more specific example, occurs in an area involving Universal Serial Bus (USB) devices.

Most operating systems include a Universal Serial Bus (USB) controller which facilitates bidirectional communication between a USB client driver and a connected USB device. Because the USB is a widespread standard, in virtualized computer systems, most guest operating systems include a guest USB controller driver designed to function with most, if not all, compliant USB controllers and a virtual USB controller (the virtual USB controller can implement the functionality of a physical USB controller such as facilitating bidirectional communication between a USB client driver and a connected USB device). In appropriate designs, the virtual USB controller will appear to the guest USB controller driver as if it were a physical USB controller, and the fact that the controller is virtualized will be transparent to the guest USB controller driver.

In the USB standard, a USB controller driver communicates with a USB controller through a frame list topology stored in various shared memory locations. Depending on the type of USB controller, the frame list topology can include data structures such as a frame list, a Transfer Descriptor (TD), and/or Queue Headers (QH). Thus, in a virtualized computer system, the guest USB controller driver and the virtual USB controller can communicate by manipulating the data structures of the frame list topology.

To provide functionality normally provided by a physical USB controller, the virtual USB controller should recognize changes to the frame list topology. One method for detecting changes to the frame list topology is to traverse the frame list topology, and compare it to frame list topologies traversed previously. However, frequently traversing the frame list topology consumes time and resources. Furthermore, in many cases the frame list topology will not have changed at all since the last traversal, making frequent traversals inefficient.

SUMMARY OF THE INVENTION

One or more embodiments of the present invention are system and method for detecting attempts to change memory made, for example, by guest instructions in a virtualized computer system. In accordance with one embodiment, memory locations to be observed are identified, and pages containing these locations are marked as read-only. Then, guest instructions execute during a trial period. During the trial period, guest instructions attempting to write to the identified memory locations cause page fault exceptions, and, in handling these exceptions, the guest instructions which write to the memory locations identified for observation are determined—an identifier of these instructions is stored. At the end of the trial period, the pages are returned to a writable status, the virtualization layer is configured to detect attempts to execute the identified instructions, and the guest instructions are allowed to execute. If an identified instruction attempts to execute, the virtualization layer will detect the attempt, and handle the attempted modification of the memory location appropriately. One such embodiment may be used to detect attempts to change a frame list topology by a guest USB controller driver. In accordance with this embodiment, a virtual USB controller walks the frame list topology, and identifies memory locations used by the frame list topology. Then, pages in which these memory locations reside are marked as read-only, for example, in a hardware page table. The guest USB controller driver is then allowed to execute as normal. When the guest USB controller driver updates the frame list topology, it will attempt to write to at least one of the pages marked as read-only. The virtualization layer will catch the resulting page fault exception, and the instruction that attempted to write to the page marked as read-only can be examined to determine if the instruction was attempting to write to a memory location used by the frame list topology. If the instruction was attempting to write to some other location, the fault can be disregarded as a false alarm. These false alarms can be expected since a frame list topology typically shares pages with other data structures and processes. If it is determined that the instruction was attempting to write to a memory location used by the frame list topology, an identifier of the instruction is stored (for example, on a watch list). Future instances of that instruction will be known to modify the frame list topology. After some amount of time, the pages containing memory locations used by the frame list topology are returned to writable status. The virtualization layer is configured to detect attempts to execute the identified instructions, and the guest USB controller driver can execute as normal. When the guest USB controller driver attempts to execute an instruction identified as modifying the frame list topology, the virtualization layer will detect the attempted instruction, and the virtual USB controller can be notified accordingly.

BRIEF DESCRIPTION OF THE DRAWINGS

FIG. 8 shows a flowchart of a method for detecting attempts to execute instructions identified as changing a data structure in accordance with one or more embodiments of the present invention.

DETAILED DESCRIPTION

Figure 1:
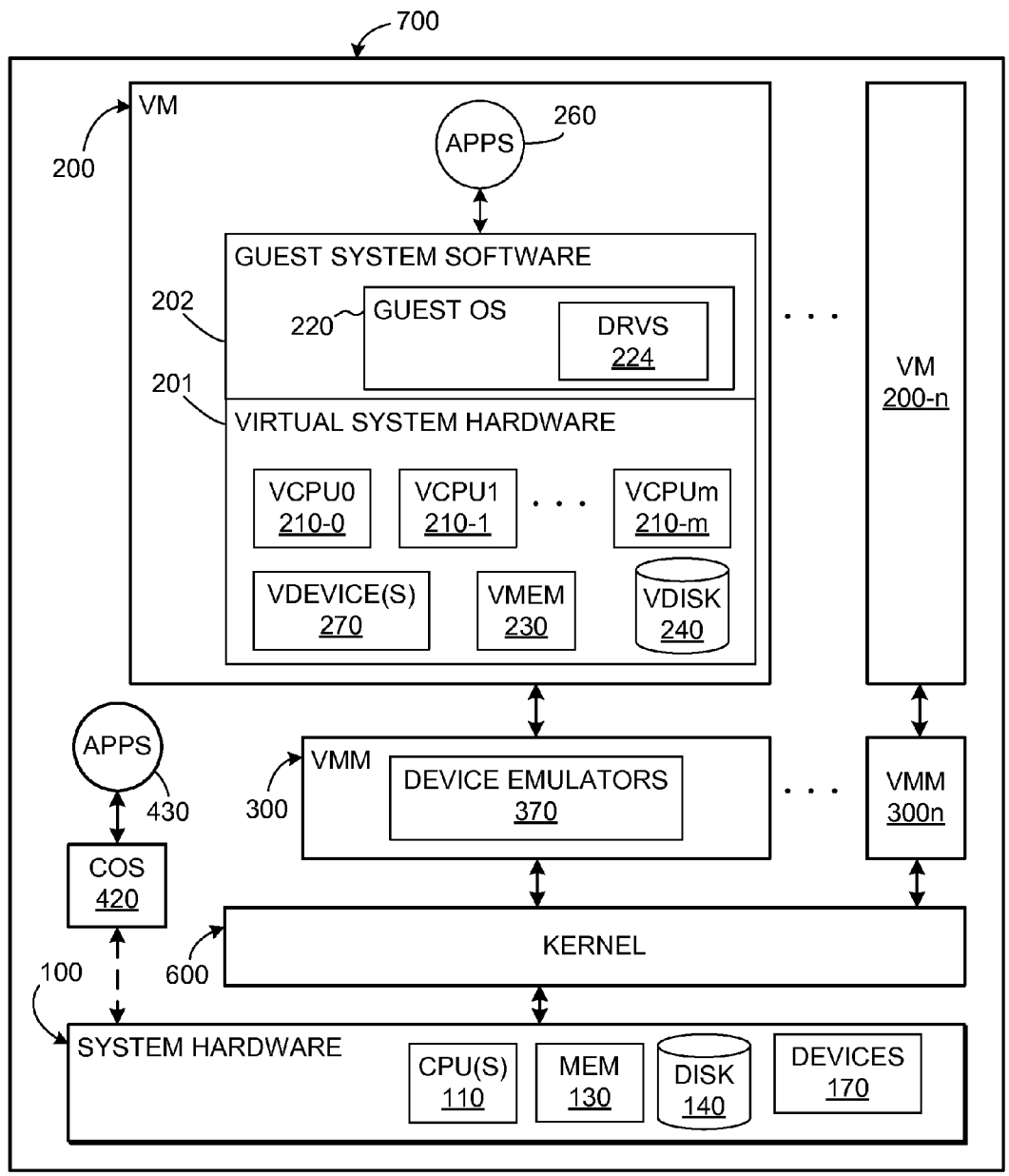
FIG. 1 shows an embodiment of a virtualized computer system in which one or more embodiments of the present invention may operate.
Figure 2:
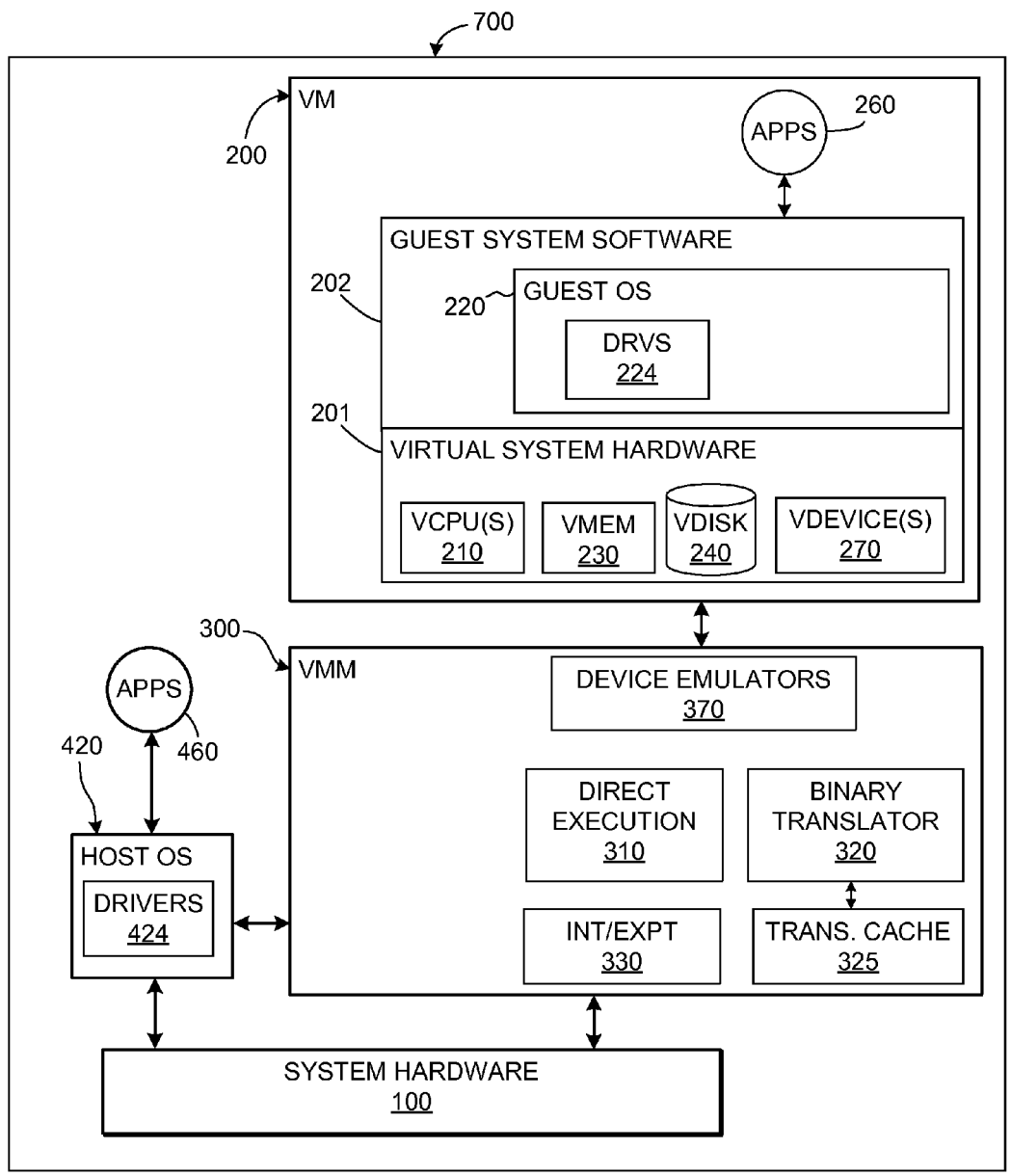
FIG. 2 shows another embodiment of a virtualized computer system in which one or more embodiments of the present invention may operate.

One or more embodiments of the present invention are applicable to computers and computer systems in general, and in particular, to virtualized computers and computer systems discussed herein in the Appendix in conjunction with FIGS. 1 and 2, as well as para-virtualized computer systems. In addition, one or more embodiments of the present invention are also applicable to non-virtualized computers and computer systems.

One or more embodiments of the present invention relate to detecting (for example, observing) attempts to change memory made by guest instructions (sometimes also referred to as guest code)—guest instructions can be any instructions or processes, for example, and without limitation, guest code is guest operating system code executing on a virtual machine in a virtualized computer system. In particular, one or more such embodiments of the present invention facilitate detecting attempts by guest instructions to change data structures stored in memory. For example, in accordance with one or more such embodiments, detecting attempts by the guest instructions to change data structures are observed by a virtualization layer.

It should be understood, that references herein to virtualization and virtualized components have been provided to illustrate one or more embodiments applicable to virtualization, but that other embodiments will be apparent to one of skill in the art without departing from the scope of the present invention.

For ease of understanding the present invention, the following describes one or more embodiments thereof in the context of an application, namely, detecting attempts to change a frame list topology of a virtual USB controller. Note that these embodiments are described for purposes of illustration and are not limiting, and that further embodiments of the present invention will be apparent to one of skill in the art without departing from the scope of the present invention.

Universal Serial Bus (USB) standards and example implementations are widely known. For example, USB interfaces are described in detail in a book entitled "Universal Serial Bus System Architecture, Second Edition," published by Mindshare, Inc. in 2001, and written by Don Anderson and Dave Dzatko. Further, U.S. Pat. No. 7,111,086 relates to USB interfaces, along with other interfaces, and is hereby incorporated by reference in its entirety.

Figure 3:
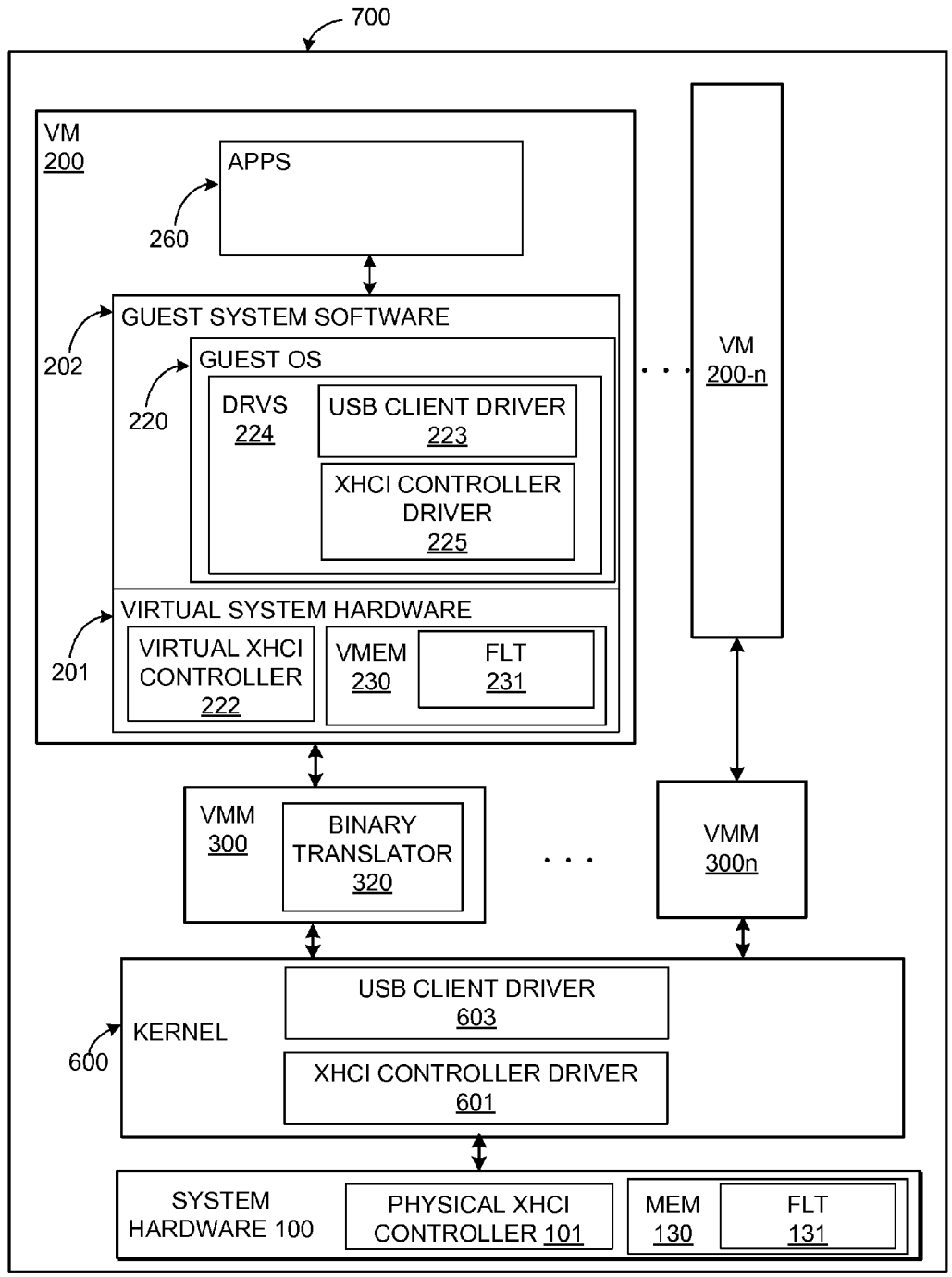
FIG. 3 shows a block diagram of a virtualized computer system that includes a virtual machine with a virtual USB controller that operates in accordance with one or more embodiments of the present invention.

FIG. 3 shows a block diagram of virtualized computer system 700 that includes virtual machine 200 (VM 200) with a virtual USB controller (i.e., virtual XHCI controller 222) that operates in accordance with one or more embodiments of the present invention. As further shown in FIG. 3, system hardware 100 includes a physical USB controller, i.e., physical XHCI controller 101. Physical XHCI controller 101 in system hardware 100 may implement an Open Host Controller Interface (OHCI), a Universal Host Controller Interface (UHCI), an Enhanced Host Controller Interface (EHCI), or any yet to be developed host controller interface. Any such host controller interface is referred to herein as an XHCI interface for generality so that any reference to XHCI herein can generally be interpreted as a reference to OHCI, to UHCI, to EHCI and/or to any such yet to be developed host controller interface. Official specifications for the OHCI, the UHCI and the EHCI (available, for example, on the Internet) may also be referenced for more detailed information about USB interfaces.

Figure 5:
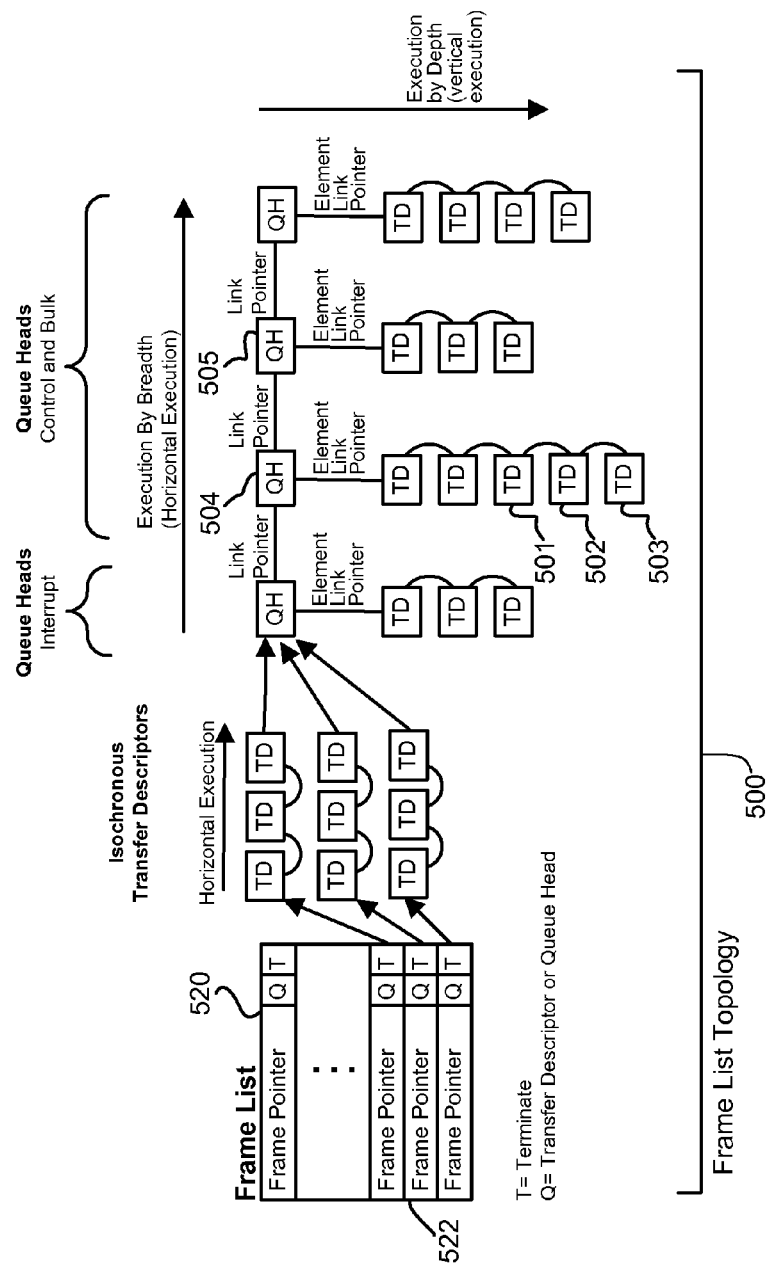
FIG. 5 shows an example of a frame list topology that can be observed in accordance with one or more embodiments of the present invention.

In accordance with one or more embodiments of the present invention, as shown in FIG. 3, memory 130 (MEM 130) of system hardware 100 stores frame list topology 131 (FLT 131). As is known, frame list topology 131 is a data structure stored in a shared memory location by which physical XHCI controller 101 and XHCI controller driver 601 interact. FIG. 5 shows an example of a frame list topology.

As further shown in FIG. 3, kernel 600 includes XHCI controller driver 601 which supervises physical XHCI controller 101. XHCI controller driver 601 can be any one of a number of commercially available USB controller drivers, and it will typically be included as a standard driver in a commercially available kernel. As further shown in FIG. 3, kernel 600 also includes USB client driver 603 which sends and receives messages to and from XHCI controller driver 601, respectively. In accordance with one or more embodiments of the present invention, USB client driver 603 can either be a commercially available driver, or it can be a custom driver designed to cooperate with a virtualization layer.

As further shown in FIG. 3, virtual machine monitor 300 (VMM 300) emulates virtual XHCI controller 222 inside VM 200. To guest applications 260 and guest OS 220, virtual XHCI controller 222 (also referred to as a "virtual USB controller") appears to have the functionality of a physical XHCI controller. It should be understood that virtual XCHI controller 222 can also be emulated by another component of the virtualization layer.

As further shown in FIG. 3, drivers 224 of guest OS 220 include a guest USB controller driver, i.e., XHCI controller driver 225. Because virtual XHCI controller 222 emulates the functionality of a physical XHCI controller, XHCI controller driver 225 may be a standard XHCI controller driver. Thus, similar to the case for XHCI controller driver 601, XHCI controller driver 225 can be any one of a number of readily available USB controller drivers, and will typically be included as a standard driver in a commercially available guest OS 220.

As further shown in FIG. 3, virtual memory 230 (VMEM 230) includes frame list topology 231. Frame list topology 231 is a data structure stored in a shared virtual memory location by which virtual XHCI controller 222 and XHCI controller driver 225 interact. FIG. 5 shows an example of frame list topology 231 that can be observed according to one or more embodiments of the present invention, and will be described below.

Frame list topology 231 is an example of a data structure stored in memory locations where it is desired to detect changes made by guest instructions (sometimes also referred to as guest code)—guest instructions can be any instructions or processes, for example, and without limitation, guest code is guest operating system code executing on a virtual machine in a virtualized computer system. Frame list topology 231 typically occupies one or more locations in guest memory (for example, VMEM 230), but one or more embodiments of the present invention can also be used to observe changes to data structures in other locations. For example, the observed data structure may be stored in memory locations that: (a) may be physical or virtual, (b) may exist in random access memory, or (c) may exist in or on another medium, such as, for example and without limitation, a hard disk. Other examples of memory locations for which it could be desired to detect changes will be apparent to one of skill in the art without departing from the scope of the present invention.

As shown in FIG. 3, drivers 224 of guest OS 220 include USB client driver 223 which is a driver for a specific component of USB-compliant hardware connected to system hardware 100. For example, USB client driver 223 may contain functions for controlling a printer, a keyboard, a scanner, a network card, an external hard drive, a mouse, a wireless card, or any other available USB peripheral. For common USB peripherals, USB client driver 223 may be included by default in drivers 224. In accordance with one or more embodiments of the present invention, USB client driver 223 sends and receives messages to and from XHCI controller driver 225, respectively.

Figure 4:
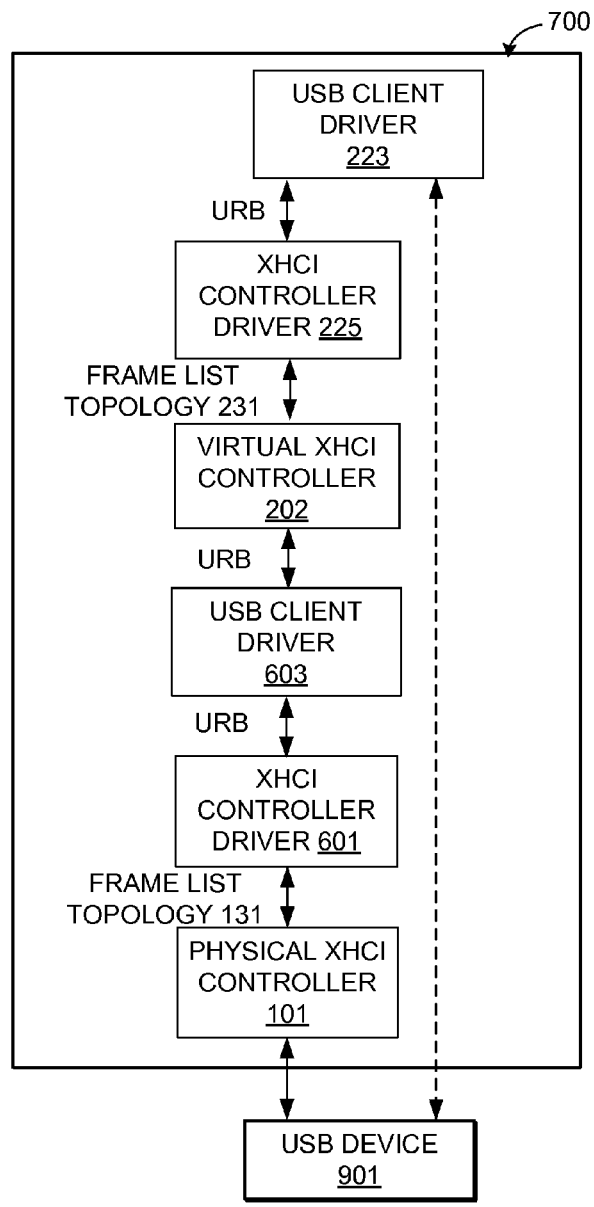
FIG. 4 shows block diagram that helps illustrate a flow of data between a USB client driver in a virtual machine and a USB device.

FIG. 4 shows block diagram that helps illustrate a flow of data between USB client driver 223 operating in VM 200 and USB device 901. As will be described in conjunction with FIG. 4, USB client driver 223, XHCI controller driver 225, virtual XHCI controller 222, USB client driver 603, XHCI controller driver 601, and physical XHCI controller 101 cooperate in a stack to facilitate communication between USB client driver 223 and USB device 901. USB device 901 can be any USB compliant device, such as a printer, a keyboard, a scanner, a network card, an external hard drive, a mouse, a wireless card, and so on. USB device 901 is connected (potentially through any number of USB hubs or connectors) to physical XHCI controller 101.

One of applications 260 (APPS 260) running in VM 200 can access USB device 901 as follows. The application (or more specifically, guest OS 220 operating on behalf of the application) calls a function in USB client driver 223. In response to the call, at step 1710, USB client driver 223 generates a USB Request Block (URB), and sends it to XHCI controller driver 225. The URB is typically a request for transmission or reception of some data.

At step 1720, XHCI controller driver 225 receives the URB, and in response, XHCI controller driver 225 processes the URB, and configures frame list topology 231 to reflect any outstanding data transfers requested in the URB.

As indicated in FIG. 3, virtual XHCI controller 222 also has access to frame list topology 231. At step 1730, virtual XHCI controller 222 reads frame list topology 231 to determine actions expected by XHCI controller driver 225. If virtual XHCI controller 222 was a physical XHCI controller, it would directly take the actions described in frame list topology 231. However, because of the added layer of abstraction, at step 1730, virtual XHCI controller 222 interprets frame list topology 231, and attempts to recreate URB(s) received by XHCI controller driver 225. If a URB has been recently received by XHCI controller driver 225, frame list topology 231 will typically have changed, and virtual XHCI controller 222 will recreate a URB capable of causing the same or a similar change. If no URB(s) has recently been received by XHCI controller driver 225, frame list topology 231 will typically be the same as it was at the time of the last interpretation. As such, it is possible that no URB(s) will be recreated by virtual XHCI controller 222. Methods for recreating URBs from frame list topologies are described in U.S. patent application Ser. No. 11/479,213 filed on Jun. 29, 2006, entitled "Virtualizing a Communications Channel in which Blocks of Data are Divided into Multiple Sub-Blocks for Conveyance" by Christopher Li, which claims priority to U.S. Patent Application Ser. No. 60/750,601 filed on Dec. 14, 2005, entitled "Virtualizing a Communications Channel in which Blocks of Data are Divided into Multiple Sub-Blocks for Conveyance," by Christopher Li, both of which are hereby incorporated by reference in their entirety.

At step 1730, recreated URB(s) are sent by virtual XHCI controller 222 to USB client driver 603. At step 1740, USB client driver 603 forwards the URB(s) to XHCI controller driver 601. Virtual XHCI controller 222 and USB client driver 603 cooperate to send and receive messages to each other in accordance with one or more methods that are well known to those of ordinary skill in the art. For example, virtual XHCI controller 222 can use various protocols for sending the content of the URB(s) to USB client driver 603.

At step 1750, in a manner similar to that carried out by XHCI controller driver 225, XHCI controller driver 601 processes the URB, and configures frame list topology 131 to reflect any outstanding data transfers requested in the URB. In some cases, frame list topology 131 will closely reflect frame list topology 231. In other cases, for example when XHCI controller driver 601 is handling URBs sent from a plurality of virtual XHCI controllers 222, frame list topology 131 may diverge from frame list topology 231.

As indicated in FIG. 3, physical XHCI controller 101 has access to frame list topology 131. At step 1760, physical XHCI controller 101 reads frame list topology 131 and performs the actions described therein. For example, physical XHCI controller 101 can initiate data transfers with USB device 901, and pass the results to frame list topology 131.

FIG. 5 illustrates an example of a data structure (a frame list topology in this case) that can be observed according to the one or more embodiments of the present invention. FIG. 5 shows frame list topology 500 which is a frame list topology that can be used in an implementation of a Universal Host Controller Interface (UCHI). Other XHCI implementations (such as EHCI or OHCI or any yet to be developed host controller interface) may use different frame list topologies, and these frame list topologies are further examples of data structures with which one or more embodiments of the present invention may be implemented. These examples have been given for the purpose of illustration and are not limiting. Changes to other USB-related and non-USB-related data structures can be detected without departing from the scope of the present invention.

As shown in FIG. 5, a root of frame list topology 500 is frame list 520; frame list 520 includes a plurality of frame pointers 522. Some of frame pointers 522 point to transfer descriptors (TDs). A transfer descriptor typically includes a buffer for storage of transmission data, and can include a pointer to either another transfer descriptor or a queue header (QH). A queue header can include a pointer to either a transfer descriptor, another queue header, or both. In the example shown in FIG. 5, frame list 520 includes a frame pointer to a chain of TDs. The chain of TDs points to a chain of QHs, including QH 504 and QH 505. As further shown in FIG. 5, QH 504 points to a chain of TDs, including TD 501, TD 502, and TD 503. An XHCI controller can traverse frame list topology 500 by iterating over frame list 520, and following links therefrom.

The data structures that makes up frame list topology 500 can reside in different locations and/or pages in memory. For example QH 504 may be stored in a location in a first page of memory, and point to QH 505 which may be stored in a location in a second page of memory. A method for detecting attempts to change a data structure, according to one or more embodiments of the present invention, can detect attempts to change a data structure that occupies a plurality of memory locations and/or pages.

Figure 6:
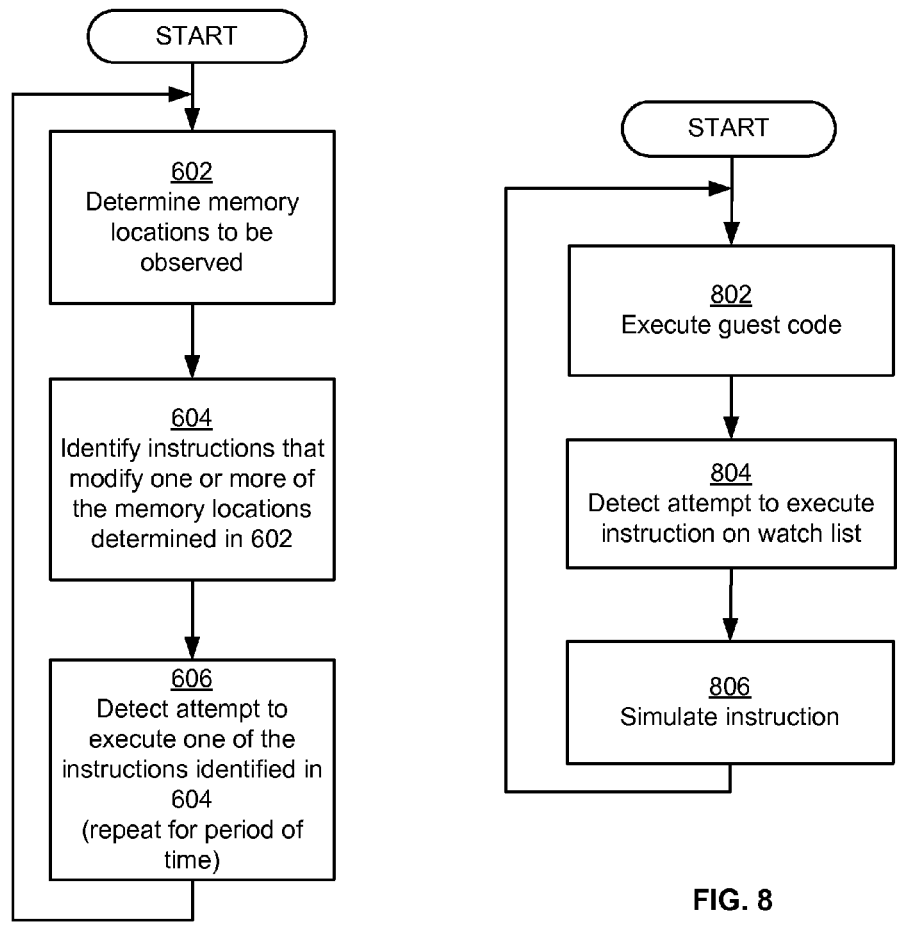
FIG. 6 shows a flowchart of a method for observing changes to a data structure in a virtual machine in accordance with one or more embodiments of the present invention.

FIG. 6 shows a flowchart of a method for detecting (or observing) attempts to change a data structure in a virtual machine in accordance with one or more embodiments of the present invention. In accordance with one or more such embodiments, the method is carried out by a virtualization layer (for example, a component thereof) such as, for example and without limitation, virtual XHCI controller 222 shown in FIG. 3. However, one or more embodiments of the method can be implemented in other virtualized or non-virtualized components or processes without departing from the scope of the present invention.

As shown in FIG. 6, at step 602, the virtualization layer determines memory locations to be observed. For example, in accordance with one or more embodiments of the present invention, virtual XHCI controller 222 determines memory locations to be observed by traversing frame list topology 231 to determine which memory locations store the data structures of frame list 231. As one of ordinary skill in the art will readily appreciate, memory locations to be observed in a particular application of such embodiments can be determined by traversing any kind of data structure, record table, or database in accordance with any one of a number of methods that are well known to those of ordinary skill in the art to determine memory locations to be observed to detect changes made by, for example and without limitation, guest instructions. Further, in accordance with one or more further embodiments of the present invention, memory locations to be observed can be determined based on a user-defined list of memory locations, or by tracing one or more debug variables to provide locations in memory.

At step 604, the virtualization layer identifies instructions that modify one or more of the memory locations to be observed. A method for identifying instructions that modify one or more of the memory locations to be observed is described below in conjunction with FIG. 7. In accordance with one or more embodiments of the present invention, the identified instructions include at least some instructions that modify the memory locations to be observed, but need not include all such instructions. In particular, in accordance with one or more such embodiments, guest code may include some instructions that modify the memory locations to be observed, but which are not identified in step 604. Also it is useful to identify a predetermined number (for example, less than all) of instructions that modify the memory locations to be observed, i.e., an exhaustive identification may not be necessary. By identifying a predetermined number of instructions that modify the memory locations to be observed, the virtualization layer is able to detect execution of more frequently called instructions that modify the memory locations to be observed more quickly. Thus, according to one or more embodiments of the present invention, identification step 604 may be a learning step in which the virtualization layer observes which instructions are responsible for a predetermined number of changes to the memory locations to be observed.

At step 606, the virtualization layer detects an attempt to execute one or more of the instructions identified in step 604. Because the instructions identified in step 604 are expected to modify the memory locations to be observed, an attempt to execute an identified instruction typically signals an attempt to modify one of the memory locations to be observed. A method for detecting attempts to execute identified instructions is described below in conjunction with FIG. 8.

In accordance with one or more embodiments of the present invention, by identifying instructions that modify memory locations to be observed, the virtualization layer, for example, through virtual XHCI controller 222, can detect changes to frame list topology 231. This is done by detecting attempts to execute the identified instructions. Detecting attempts to execute instructions typically has lower overhead than detecting attempts to modify locations in memory directly, for example, where detecting attempts to modify locations in memory entails the use of page protection methods. Furthermore, because many hardware architectures mark memory as read-only on a page-specific basis, detecting attempted instruction execution can reduce the frequency of false-positives, and increase the efficiency of embodiments of virtual XHCI controller 222.

Figure 7:
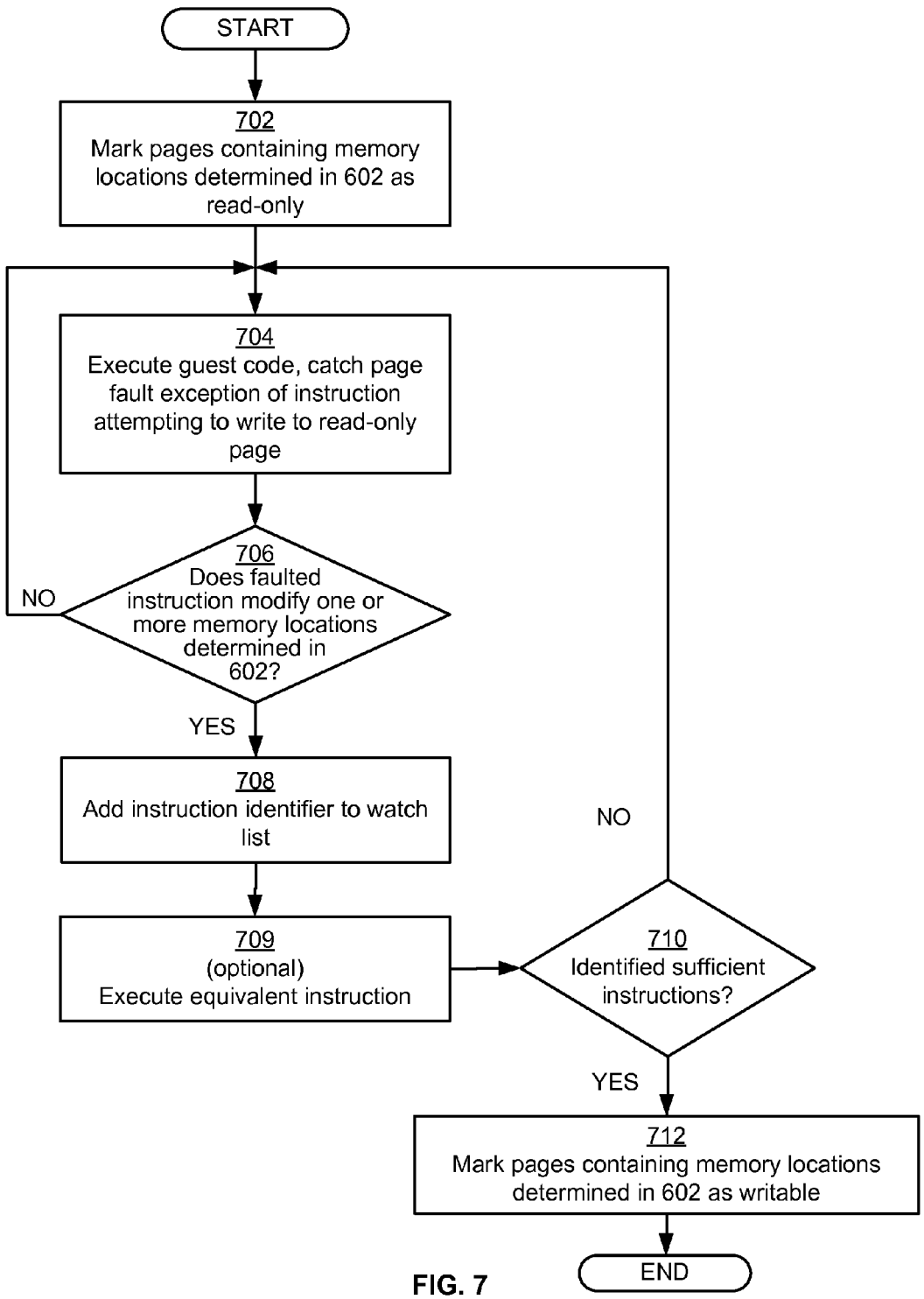
FIG. 7 shows a flowchart of a method for identifying instructions that change a data structure in accordance with one or more embodiments of the present invention.

FIG. 7 shows a flowchart of a method for identifying instructions that change a data structure in accordance with one or more embodiments of the present invention. In accordance with one or more embodiments of the present invention, the method is performed by a virtualization layer (for example, a component thereof), such as, for example and without limitation, virtual XHCI controller 222 shown in FIG. 3. However, the method can be implemented by other virtualized or non-virtualized components or processes without departing from the scope of the present invention.

As shown in FIG. 7, at step 702, the virtualization layer marks pages containing memory locations to be observed as read-only. For example, to do this, virtual XHCI controller 222 can use a hardware page table to prevent writes to pages containing components of frame list topology 231.

While reference is made herein to architectures in which memory locations are marked as read-only or writable at the granularity of a page, this embodiment is shown for purposes of illustration and is not limiting. One or more further embodiments of the present invention can be implemented with architectures in which memory locations are marked as read-only or writable using various techniques. For example, according to one or more such further embodiments of the present invention, the virtualization layer marks as read-only specifically the memory locations to be observed. Other examples will be apparent to one of skill in the art without departing from the scope of the present invention, and references to the use of pages does not preclude the applicability to such other architectures or implementations.

At step 704, the virtualization layer executes guest code. For example, the virtualization layer can allow the guest code to execute as normal. The execution of guest code can include execution of XHCI controller driver 225 which will at some point typically attempt to change frame list topology 231. When this occurs, the virtualization layer will catch a page fault exception due to an instruction attempting to write to a read-only page. For example, during the execution of step 704, XHCI controller driver 225 might attempt to change a memory location that is contained in a page marked as read-only; when a process attempts to write to a page marked as read-only, a page fault exception will occur. The page fault exception will typically include an identifier of the instruction causing the exception, and a pointer to the location on the faulted page. As such, and in accordance with one or more embodiments of the present invention, the virtualization layer catches the exception, and determines the instruction responsible for the exception.

At decision step 706, the virtualization layer determines if the faulted instruction modifies one or more of the memory locations to be observed. Because the memory locations to be observed can share pages with other memory locations, the faulted instruction might be attempting to write to a location other than a memory location to be observed. The virtualization layer can determine if the faulted instruction modifies one or more of the memory locations to be observed, for example and without limitation, by examining a data pointer to the location of the faulted page contained in the exception. If the virtualization layer determines that the faulted instruction does not modify one of the memory locations to be observed, the virtualization layer returns to executing guest code at step 704. However, if the virtualization layer determines that the faulted instruction does modify one of the memory locations to be observed, control is transferred to step 708.

At step 708, the virtualization layer adds an identifier of the faulted instruction to a watch list. In some architectures, the instruction identifier of the faulted instruction is included in the page fault exception. The instruction identifier can be, for example, dependent on the memory address from which the instruction was fetched (such as an extended instruction pointer). According to one or more embodiments of the present invention, the virtualization layer determines if the faulted instruction is already present on the watch list, and if the faulted instruction is not already on the watch list, adds it to the watch list.

According to one or more embodiments of the present invention, at step 708, adding an identifier of the faulted instruction to a watch list includes translating the faulted instruction. In accordance with one or more such embodiments, translating the faulted instruction prepares one or more instructions to execute in place of the faulted instruction upon future attempts to execute instructions with the same identifier. The one or more instructions to execute in place of the faulted instruction can include, for example and without limitation, simulated instructions for performing a function equivalent to that of the faulted instruction and for notifying the virtualization layer (for example, virtual XHCI controller 222) that frame list topology 231 has been updated. Furthermore, in accordance with one or more further such embodiments, the simulated instructions can include instructions for avoiding future page fault exceptions by the same faulted instruction.

According to one or more embodiments of the present invention, step 704 of executing guest code includes detecting attempted execution of instructions on the watch list. In accordance with one or more such embodiments of the present invention, instructions on the watch list can be handled specially so they do not cause continued page fault exceptions. A method for handling attempted execution of instructions on the watch list is described below in conjunction with FIG. 8.

Optionally, at step 709, the virtualization layer executes one or more instructions equivalent to the faulted instruction. The virtualization layer can execute an instruction that will have the same effect on memory as the faulted instruction. For example, the virtualization layer can execute instructions to modify the frame list topology as described in the faulted instruction, taking precautions to avoid a recurrence of the same page fault. The virtualization layer can use a writable page table entry to change the frame list topology without triggering another page fault. As another example, the virtualization layer can make writable the page to be written by the faulted instruction, allow the instruction to execute, and then re-mark the page as read-only. Executing one or more equivalent instructions allows the guest code to execute without any apparent interruption.

At decision step 710, the virtualization layer determines if a predetermined number of instructions has been identified. The virtualization layer can determine if a predetermined number of instructions has been identified using a variety of methods. In accordance with one or more embodiments of the present invention, the usefulness of the predetermined number of identified instructions can be based on (either alone or in combination with) an amount of time spent identifying instructions, a percentage of faulted instructions that are found to be present on the watch list already, and/or a size of the watch list. Other methods for determining the usefulness of the predetermined number of instructions has been identified will be apparent to one of skill in the art without departing from the scope of the present invention. Further, in accordance with one or more embodiments of the present invention, the predetermined number may be changed either as a system parameter or in response to the above-identified factors. If the virtualization layer determines that a predetermined number of instructions has not been identified, the virtualization layer returns to executing guest code at step 704. However, if the virtualization layer determines that a predetermined number of instructions has been identified, at step 712, the virtualization layer marks the pages containing the memory locations to be observed as writable. According to one or more embodiments of the present invention, the virtualization layer returns the memory pages to the read-only/writable state they were in prior to the virtualization layer marking the pages as read-only at step 702. Thus, after step 712, when the virtualization layer marks some of the pages as writable, others of the pages (for example, pages that were marked read-only before step 702) may still be read-only.

Marking the pages containing the memory locations to be observed as writable at step 712 facilitates detecting attempts by guest code to modify memory. For example, after marking the pages as read-only at step 712, XHCI controller driver 225 can modify frame list topology 231 without creating a page fault. Rather, these writes to frame list topology 231 will be detected by detecting attempts to execute the instructions directly. Detecting attempted instruction execution provides an efficient method for observing changes to a data structure. A method for detecting attempted instruction execution is described below in conjunction with reference FIG. 8. Because XHCI controller driver 225 modifies frame list topology 231 without creating a page fault, the performance of both XHCI controller driver 225 and virtual XHCI controller 222 are improved.

FIG. 8 shows a flowchart of a method for detecting attempts to execute instructions identified as changing a data structure in accordance with one or more embodiments of the present invention. In accordance with one or more embodiments of the present invention, the method is performed by a virtualization layer (i.e., a component thereof) such as, for example and without limitation, binary translator 320 of VMM 300 shown in FIG. 2. However, the method can be performed by other virtualized or non-virtualized components or processes without departing from the scope of the present invention.

As shown in FIG. 8, at step 802, guest code is executed. The guest code can include, for example, XHCI controller driver 225. The guest code can execute directly, or indirectly, for example, through binary translation. In accordance with one or more such embodiments of the present invention, some portion of the guest code executes directly, and another portion of the guest code is executed through binary translation. The code for XHCI controller driver 225 is typically executed through binary translation.

At step 804, an attempt to execute an instruction on a watch list is detected. An attempt to execute an instruction can be detected, for example, by recognizing the instruction identifier of one or more of the instructions on the watch list (in accordance with one or more further embodiments of the present invention, an attempt to execute an instruction can be detected by recognizing a virtual address of the instruction). According to one or more embodiments of the present invention, attempts to execute instructions on the watch list are detected in binary translation. The concepts and general techniques of binary translation are well known in the art. A method for recognizing instructions in binary translation based on an instruction identifier is described in U.S. Pat. No. 6,397,242 to Devine et al. ("Virtualization System Including a Virtual Machine Monitor for a Computer with a Segmented Architecture").

At step 806, in response to detecting an attempt to execute an instruction on the watch list, a simulation of the detected instruction is executed. In accordance with one or more embodiments of the present invention, executing a simulation of the instruction can include, for example, calling out to the virtualization layer, executing a translation of the instruction, notifying a component of the virtualization layer (such as virtual XHCI controller 222) that the data structure has been changed, and/or executing the original instruction. Executing a simulation of the instruction beneficially allows those changes to be processed specially by the virtualization layer.

After processing the instruction, the method returns to executing guest code at step 802.

According to one or more embodiments of the present invention, the virtualization layer will periodically return to step 602 (refer to FIG. 6) of determining memory locations to be observed. Re-determining memory locations to be observed is beneficial, since some writes to memory may be missed by the virtualization layer. For example, the guest code may include some guest instructions that modify the memory locations to be observed but which are not included on the watch list. The virtualization layer can examine the memory locations to be observed to determine if any changes to memory were undetected. For example, virtual XHCI controller 222 can periodically traverse frame list topology 231, resetting the memory locations to be observed, and noting any changes to frame list topology 231 not previously detected. These periodic traverses are beneficial for catching frame list topology 231 modifications caused by instructions that execute infrequently, and for ensuring that such changes are not unnoticed for an indefinite period of time. Advantageously, the inventive, instruction-based method for detecting changes to memory locations decreases the frequency with which complete traverses of the frame list topology occur when compared to a traverse-only method.

Thus, in combination, in accordance with one or more embodiments of the present invention, three phases of memory observation provide accurate and efficient monitoring of a data structure. In a first phase, the data structure is traversed to gather a picture (for example, an exact picture) of the memory state, as well as, to determine memory locations to be observed. Thus, traversing the data structure provides an initial picture (for example, an accurate picture) of memory locations used by the data structure. In a second phase, those memory locations are marked as read-only, and guest code is executed for a trial period. Executing guest code for a trial period facilitates identification of guest instructions modifying the data structure, and allows for detection of changes to memory without the need for frequent data structure traverses. In a third phase, the guest code is allowed to execute as normal, and attempts to execute guest instructions identified as modifying the data structure are detected. Executing the guest code and detecting attempts to execute identified instructions provides for efficient execution of guest code (without excessive page-faults, for examples), rapid detection of the most frequently occurring data structure modifications, and decreased frequency of data structure traverses. The picture of the data structure is maintained with a high degree of accuracy and with minimal processing overhead.

Thus, referring to FIG. 4, in implementing the flow of data between USB client driver 223 operating in VM 200 and USB device 901, one or more embodiments of the invention may be utilized, for example, at steps 1720 and 1730 to save virtual XHCI controller 222 from reading frame list topology 231 unless there has been a change thereto.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment. Further, reference in the specification to "change" or "changing" and the like may also be understood as "modify" or "modifying" and the like.

One or more embodiments of the present invention also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above.

While the invention has been particularly shown and described with reference to one or more embodiments, it will be understood by persons skilled in the relevant art that various changes in form and details can be made therein without departing from the spirit and scope of the invention. For example, in accordance with one or more embodiments of the present invention, computer code debugger software utilizes one or more of the methods described herein to detect attempts to modify memory made by computer code being debugged.

Appendix Relating to Virtualized Computer Systems

As is well known in the field of computer science, a virtual machine (VM) is an abstraction—a "virtualization"—of an actual physical computer system. FIG. 1 shows one possible arrangement of computer system 700 that implements virtualization. As shown in FIG. 1, virtual machine (VM) or "guest" 200 is installed on a "host platform," or simply a "host," which includes system hardware, that is, hardware platform 100 of computer system 700, and one or more layers or co-resident components comprising system-level software, such as an operating system or similar kernel, or a virtual machine monitor or hypervisor (see below), or some combination of these. System hardware 100 typically includes one or more processors 110, memory 130, some form of mass storage 140, and various other devices 170.

Each VM 200 (i.e., VM 200 to VM 200-*n*) will typically have both virtual system hardware 201 and guest system software 202. The virtual system hardware typically includes at least one virtual CPU (VCPU0 210-0 to VCPUm 210-*m*), virtual memory 230 (VMEM 230), at least one virtual disk 240 (VDISK 240), and one or more virtual device(s) 270 (VDEVICE(S) 270). Note that a disk—virtual or physical—is also a "device," but is usually considered separately because of the important role of the disk. All of the virtual hardware components of the VM 200 may be implemented in software using known techniques to emulate corresponding physical components. Guest system software 202 includes guest operating system (OS) 220 and drivers 224, as needed for the various virtual devices 270.

Note that a single VM (for example, VM 200) may be configured with more than one virtualized processor, for example, FIG. 1, illustrates multiple virtual processors VCPU0 210-0, VCPU1 210-1, . . . , VCPUm 210-*m*. Embodiments described herein may be used regardless of the type of multi-threading—physical and/or logical—or the number of processors included in a VM.

The design and operation of virtual machines are well known.

Some interface is generally required between guest software within a VM (for example, VM 200) and various hardware components and devices in underlying system hardware platform 100. This interface—which may be referred to generally as "virtualization software"—may include one or more software components and/or layers, possibly including one or more software components known as "virtual machine monitors" (VMMs) (for example, VMM 300, . . . , VMM 300-*n* shown in FIG. 1), "hypervisors," or virtualization "kernels" (for example, kernel 600 shown in FIG. 1). Because virtualization terminology has evolved over time and has not yet become fully standardized, these terms do not always provide clear distinctions between software layers and the components to which they refer. For example, the term "hypervisor" is often used to describe both a VMM and a kernel (for example, VMM 300 and kernel 600 shown in FIG. 1) together, either as separate but cooperating components or with one or more of VMM 300, . . . , VMM 300-*n* incorporated wholly or partially into kernel 600 itself; however, the term "hypervisor" is sometimes used instead to mean some variant of a virtual machine monitor alone, which interfaces with some other software layer(s) or component(s) to support the virtualization. Moreover, in some systems, some virtualization code is included in at least one "superior" VM to facilitate the operations of other VMs. Furthermore, specific software support for virtual machines may be included in the host OS itself. Unless otherwise indicated, the embodiments of the present invention described above may be used in virtualized computer systems having any type or configuration of virtualization software.

FIG. 1 shows VMM 300, . . . , VMM 300-*n* as being separate entities from other components of the virtualization software. Although some software components used to implement one or more embodiments of the present invention are shown and described as being within a "virtualization layer" that is located logically between all virtual machines and the underlying hardware platform and/or system-level host software, this virtualization layer can be considered part of the overall virtualization software (although it would be possible to implement at least part of this layer in specialized hardware). Again, unless otherwise indicated or apparent from the description, it is to be assumed that one or more embodiments of the present invention can be implemented anywhere within the overall structure of the virtualization software, and even in systems that provide specific hardware support for virtualization.

Various virtualized hardware components in VM 200, such as virtual CPU(s) VCPU0 210-0, . . . , VCPUm 210-*m*, virtual memory 230, virtual disk 240, and virtual device(s) 270, are shown as being part of VM 200 for the sake of conceptual simplicity. In actuality, these "components" are usually implemented as software emulations 370 included in VMM 300. In such an arrangement the VMM may (but need not) be set up to expose "generic" devices.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. The term "full virtualization" is sometimes used to denote a system in which no software components are included in the guest other than those that would be found in a non-virtualized computer; thus, guest OS 220 could be an off-the-shelf, commercially available OS with no components included specifically to support use in a virtualized environment. In contrast, the term "para-virtualization" is sometimes used to denote a system wherein the guest is configured to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that guest OS 220 (in particular, its kernel) is specifically designed to support such an interface. According to this view, having, for example, an off-the-shelf version of Microsoft Windows XP as guest OS 220 would not be consistent with the term para-virtualization. Others define para-virtualization more broadly to include any guest OS 220 with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments of the present invention are not restricted to use in systems with any particular "degree" of virtualization and are not to be limited to any particular term of full or partial ("para-") virtualization.

In addition to the sometimes fuzzy distinction between full and partial (para-) virtualization, two arrangements of intermediate system-level software layer(s) are in general use—a "hosted" configuration (which is shown in FIG. 2) and a non-hosted configuration (which is shown in FIG. 1). In a hosted virtualized computer system, an existing, general-purpose operating system forms a "host" OS that is used to perform certain input/output (I/O) operations, alongside and sometimes at the request of VMM 300. As shown in FIG. 2, host OS 420, which usually includes drivers 424 and supports applications 460 of its own, and VMM 300 are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002). In addition to device emulators 370, FIG. 2 also illustrates some of the other components that are also often included in VMM 300 of a hosted virtualization system; many of these components are found in VMM 300 of a non-hosted system as well. For example, interrupt/exception handlers 330 (int/expt 330) may be included to help context-switching, and direct execution engine 310 and binary translator 320 with associated translation cache 325 may be included to provide execution speed while still preventing VM 200 from directly executing certain privileged instructions.

As illustrated in FIG. 1, in many cases, VMMs 300, ..., 300-n are deployed on top of a software layer—kernel 600—constructed specifically to provide efficient support for VMs 200, ..., 200-n. This configuration is frequently referred to as being "non-hosted." Kernel 600 may also handle other applications running on it that can be separately scheduled, as well as a console operating system that, in some architectures, is used to boot the system and facilitate certain user interactions with the virtualization software. Note that kernel 600 is not the same as a kernel that will be within guest OS 220—as is well known, every operating system has its own kernel. Note also that kernel 600 is part of the "host" platform of the VM/VMM as defined above even though the configuration shown in FIG. 1 is commonly termed "non-hosted"; moreover, the kernel may be both part of the host and part of the virtualization software or "hypervisor." The difference in terminology is one of perspective and definitions that are still evolving in the art of virtualization.

What is claimed is:

1. A method for detecting attempts to change memory by a group of instructions comprising:
    during a trial period:
        temporarily marking as read-only a memory page that includes a memory location to be observed;
        catching an exception when an instruction attempts to write to the marked memory page;
        in response to the instruction attempting to write to the memory location to be observed, storing an identifier of the instruction in a watch list, wherein the identifier uniquely identifies the instruction based on a memory address from which the instruction is fetched;
    subsequent to the trial period:
        marking the memory page writable; and
        detecting attempts, based on the watch list, to execute the identified instruction.

2. The method of claim 1, further comprising determining the memory locations to be observed by traversing a data structure, wherein the memory location to be observed is occupied by the data structure.

3. The method of claim 1, wherein the marking as read-only the memory page comprises marking an entry for the memory page as read-only in a hardware page table.

4. The method of claim 1, wherein the identifier comprises an extended instruction pointer.

5. The method of claim 1, wherein the instruction is executed through binary translation and the detecting of the attempts to execute the identified instruction comprises detecting in binary translation attempts to execute the instruction.

6. The method of claim 1, wherein the detecting of the attempts further comprises:
    subsequent to the unmarking, executing the instruction; and
    recognizing execution of the instruction on the basis of the stored identifier.

7. The method of claim 6, wherein the instruction is recognized in binary translation.

8. The method of claim 7, further comprising responsive to detecting an attempt to execute the instruction, executing a translation of the instruction.

9. The method of claim 1, wherein the memory location is occupied by a frame list topology.

10. The method of claim 9, wherein the frame list topology comprises a URCI frame list topology, an ERCI frame list topology, or an ORCI frame list topology.

11. The method of claim 1, wherein the memory page is in virtual memory and the detecting is performed by a virtualization layer.

12. The method of claim 11, wherein the instruction comprises an instruction of a guest operating system executing in a virtual machine.

13. The method of claim 12, wherein the instruction belongs to a device driver of the guest operating system.

14. The method of claim 1, further comprising:
    in response to the exception, identifying the instruction prior to storing of the identifier of the instruction.

15. A method for monitoring a data structure in memory for changes, the method comprising:
    identifying a plurality of memory locations that are occupied by the data structure;
    learning which instructions of a first software entity are responsible for updating the data structure by marking as read-only memory pages that include the plurality of memory locations, thereby triggering a exception when an attempt is made to write to the data structure, and recording in a watch list identifiers of each instruction that triggers the exception when writing to the memory locations occupied by the data structure, wherein a respective identifier uniquely identifies the corresponding instruction based on a memory address from which the instruction is fetched;
    removing the read-only marking from the memory pages after a selected number of the instructions of the first software entity are identified through the learning, the removing includes marking the memory pages writable;
    unmarking as read-only the memory pages previously marked; and
    notifying a second software entity that instructions that write to the memory locations occupied by the data structure were executed thereby indicating that the data structure might have been modified by the first software entity.

16. A non-transitory machine readable medium embodying computer instructions causing a processor to perform a method for monitoring a data structure in memory for changes, the method comprising:
    identifying a plurality of memory locations that are occupied by the data structure;
    learning which instructions of a first software entity are responsible for updating the data structure by marking as read-only memory pages that include the plurality of memory locations, thereby triggering a exception when an attempt is made to write to the data structure, and recording in a watch list identifiers of each instruction that triggers the exception when writing to the memory locations occupied by the data structure, wherein a respective identifier uniquely identifies the corresponding instruction based on a memory address from which the instruction is fetched;
    unmarking as read-only the memory pages previously marked after a selected number of the instructions of the first software entity are identified through the learning, the unmarking includes marking the memory pages writable; and subsequent to the unmarking, detecting execution of any of the instructions identified in the watch list, and notifying a second software entity that instructions that write to the memory locations occupied by the data structure were executed thereby indicating that the data structure might have been modified by the first software entity.

17. The medium of claim 16, wherein the first software entity is a guest operating system executing in a virtual machine and the second software entity is a virtual controller.

18. A method for detecting attempts to change memory by a group of instructions comprising:

identifying an instruction that writes to memory locations to be observed, the identifying including temporarily marking as read-only a memory page that includes the memory locations to be observed, thereby causing an exception when an attempt is made to write to the marked memory page, and in response to the exception caused by the attempt to write to the marked memory page, determining if the memory locations to be observed share memory pages with other memory locations and upon determining that the instruction that triggered the exception is not attempting to write to a location in the other memory locations, storing an identifier of the instruction that triggered the exception in a watch list, wherein the identifier uniquely identifies the instruction based on a memory address from which the instruction is fetched; and detecting attempts, using the stored identifier, to execute the identified instruction.

* * * * *